(12) United States Patent
Sehrawat (10) Patent No.: US 11,985,240 B2
(45) Date of Patent: May 14, 2024

(54) COMPUTING SYSTEM WITH DECENTRALIZED AUTHENTICATION AND AUTHORIZATION

(71) Applicant: Seagate Technology LLC, Fremont, CA (US)

(72) Inventor: Vipin Singh Sehrawat, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 157 days.

(21) Appl. No.: 16/947,121

(22) Filed: Jul. 20, 2020

(65) Prior Publication Data

US 2022/0021536 A1 Jan. 20, 2022

(51) Int. Cl.
*G06F 21/00* (2013.01)
*G06F 16/23* (2019.01)
*H04L 9/08* (2006.01)
*H04L 9/32* (2006.01)
*H04L 9/40* (2022.01)

(52) U.S. Cl.
CPC .......... *H04L 9/321* (2013.01); *G06F 16/2379* (2019.01); *H04L 9/085* (2013.01); *H04L 63/1425* (2013.01)

(58) Field of Classification Search
CPC ...... H04L 9/321; H04L 9/085; H04L 63/1425
See application file for complete search history.

(56) References Cited

U.S. PATENT DOCUMENTS

| | | | |
|---|---|---|---|
| 8,468,244 B2 | 6/2013 | Redlich et al. | |
| 8,732,468 B2 | 5/2014 | Roy et al. | |
| 8,745,372 B2 | 6/2014 | Orsini et al. | |
| 8,861,727 B2 | 10/2014 | Resch et al. | |
| 8,904,520 B1* | 12/2014 | Nachenberg | H04L 63/1425 726/22 |
| 9,338,147 B1 | 5/2016 | Rothstein et al. | |
| 9,563,507 B2 | 2/2017 | Dhuse et al. | |
| 9,680,651 B2 | 6/2017 | Anderson | |
| 9,734,169 B2 | 8/2017 | Redlich et al. | |
| 9,787,472 B1* | 10/2017 | Lampkins | H04L 9/085 |
| 10,360,097 B2 | 7/2019 | Resch et al. | |
| 10,474,497 B1* | 11/2019 | Kancharla | G06F 9/4875 |
| 10,498,715 B2 | 12/2019 | Pogorelik et al. | |
| 2002/0007346 A1* | 1/2002 | Qiu | H04L 63/126 705/50 |
| 2006/0020784 A1* | 1/2006 | Jonker | H04L 63/0823 713/157 |

(Continued)

FOREIGN PATENT DOCUMENTS

WO WO-2021059491 A1 * 4/2021

*Primary Examiner* — Michael M Lee
(74) *Attorney, Agent, or Firm* — Kagan Binder, PLLC (57) ABSTRACT

A computing system can have a data storage device connected to a host as part of a distributed computing system with an initial reputation score assigned to the data storage device with a decentralize module. The data storage device is positioned in a hierarchical device organization based on the reputation score with the hierarchical device organization maintained by the decentralize module. A decentralized secret sharing scheme generated by the decentralize module can authenticate the host with multiple different secrets sourced from different components logically positioned in different levels of the hierarchical device organization.

19 Claims, 4 Drawing Sheets

(56) References Cited

U.S. PATENT DOCUMENTS

| | | | | |
|---|---|---|---|---|
| 2014/0173723 A1* | 6/2014 | Singla | ............... | H04L 63/1425 |
| | | | | 726/22 |
| 2016/0094540 A1* | 3/2016 | Camenisch | ............ | H04L 9/085 |
| | | | | 726/8 |
| 2016/0132699 A1* | 5/2016 | Miller | .................... | G06F 21/80 |
| | | | | 713/193 |
| 2016/0241578 A1* | 8/2016 | Mahler | ............... | H04L 63/1425 |
| 2016/0378350 A1* | 12/2016 | Motwani | ............ | H04L 67/1097 |
| | | | | 711/154 |
| 2018/0115577 A1* | 4/2018 | Shukla | .................... | G06F 21/55 |
| 2019/0280863 A1* | 9/2019 | Meyer | ...................... | G06F 7/08 |
| 2019/0305938 A1* | 10/2019 | Sandberg-Maitland | .................... | |
| | | | | H04L 9/0897 |
| 2019/0386972 A1* | 12/2019 | Boutnaru | ............. | H04L 9/0894 |
| 2020/0320226 A1* | 10/2020 | Chitrak Gupta | ...... | G06F 21/602 |
| 2021/0168173 A1* | 6/2021 | Compton | ............ | H04L 63/1416 |
| 2022/0147640 A1* | 5/2022 | Matsuo | .................... | G09C 1/00 |

\* cited by examiner

FIG. 7

# COMPUTING SYSTEM WITH DECENTRALIZED AUTHENTICATION AND AUTHORIZATION

SUMMARY

A computing system, in accordance with various embodiments, has a data storage device connected to a host as part of a distributed computing system with the data storage device having a decentralize module with a malicious circuit to generate a decentralized secret sharing scheme and maintain a hierarchical device organization based on a reputation score assigned by the decentralize module.

Some embodiments of a computing system has a data storage device connected to a host as part of a distributed computing system with an initial reputation score assigned to the data storage device with a decentralize module. The data storage device is positioned in a hierarchical device organization based on the reputation score with the hierarchical device organization maintained by the decentralize module. A decentralized secret sharing scheme generated by the decentralize module can authenticate the host with multiple different secrets sourced from different components logically positioned in different levels of the hierarchical device organization.

In other embodiments, a computing system has a data storage device connected to a host as part of a distributed computing system with an initial reputation score assigned to the data storage device with a decentralize module. The data storage device is positioned in a hierarchical device organization based on the reputation score with the hierarchical device organization maintained by the decentralize module. A decentralized secret sharing scheme generated by the decentralize module can authenticate the host with multiple different secrets sourced from different components logically positioned in different levels of the hierarchical device organization. The decentralized secret sharing scheme is executed in response to a threshold number of malicious threats to the distributed computing system.

DETAILED DESCRIPTION

Generally, various embodiments of the present disclosure are directed to a computing system employing intelligent component monitoring to provide optimized decentralized security authentication in response to a dynamic component security reputation.

As the number of devices, hosts, and other components that generate and distribute data grows over time, the opportunity for malicious attacks to data and data accessing components increases. The response to a detected malicious threat from a component of a distributed data storage system can trigger an increased authentication and/or authorization protocol for many components of the system. For instance, a threat from a single system component can prompt the assumption that all system components are a security risk and heightened security authorization and/or authentication procedures are initiated. While such heightened security authorization can be effective, increasing security protocol for numerous components of a system can be inefficient, complicated, and resource intensive.

With these issues in mind, embodiments of a computing system can intelligently react to a detected, or predicted malicious threat by decentralizing security protocol involving component authorization and/or authentication. By maintaining a security reputation for the assorted components of a distributed computing system, a hierarchical security organization can be established and maintained that allows for efficient decentralized security protocol execution. The generation of decentralized sharing schemes allows for fast and precise component authentication from multiple different system components, which increases the effectiveness of the decentralized security protocol.

Figure 1:
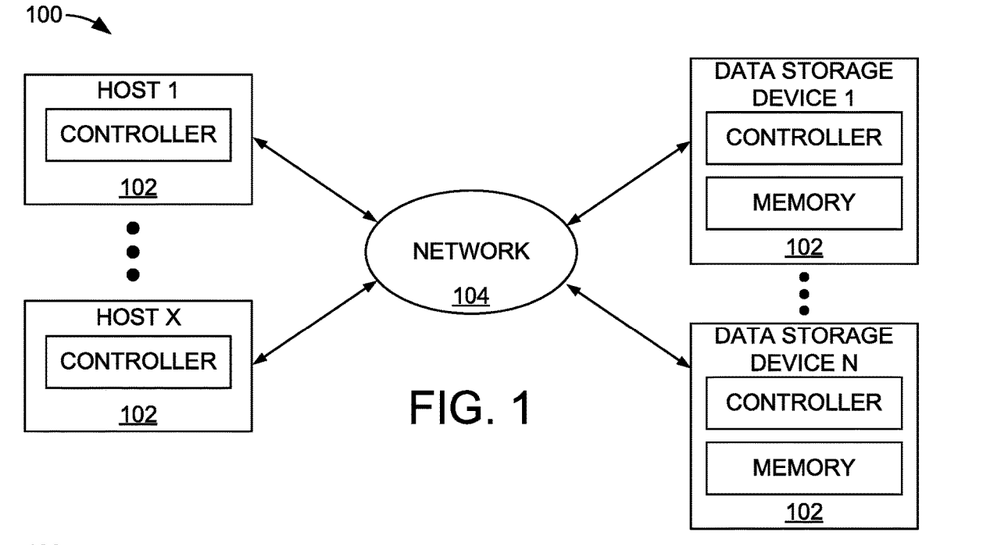
FIG. 1 is a block representation of an example computing system in which assorted embodiments can be practiced.

An example distributed computing system 100 is depicted in FIG. 1 and has a plurality of components 102 interconnected via a network 104. A system component 102 may be any computing node, such as a controller, data storage device, router, server, or other data generating, distributing, or storing device. As a non-limiting embodiment, the system 100 may have several different host controllers positioned at different physical locations and accessing numerous different data storage devices positioned at still further different physical locations.

The use of data storage devices in the system 100 can consist of any type, capacity, speed, and security capabilities, but, in some embodiments, non-volatile memories are concurrently utilized to provide data storage, and retrieval, to at least one remotely connected host. The advent of greater numbers of hosts that generate and distribute data, such as sensors and intelligent gadgets that can be collectively characterized as internet of things (IoT) objects, can complicate security protocol by introducing potential and actual malicious threats from one or more unauthorized third-party attackers. That is, greater numbers of components 102 in the system 100 creates greater opportunities for data, components 102, and network 104 data pathways to be intercepted, monitored, and/or hacked, which jeopardizes the integrity of the entire distributed computing system 100.

The grave risk associated with malicious threats can be countered with dynamic security protocol that detects malicious attacks and increases the security measures taken thereafter. For instance, a detected malicious attack to a data storage device can trigger all data stored in the device to be authenticated prior to being sent to any other component 102 of the system 100. Another example involves a malicious threat being countered with increased authentication measures for large groups of components 102, such as each data storage device, all hosts, or both. Although effective at mitigating the risk of sensitive data and various components 102 from being compromised by current and future malicious threats, the broad spectrum increase in security protocol and/or authenticating measures can be detrimental to system 100 performance and operation due to the introduction of greater volumes of processing, time, and communications involved with authenticating large numbers of components 102, commands, data, and data access requests.

Figure 2:
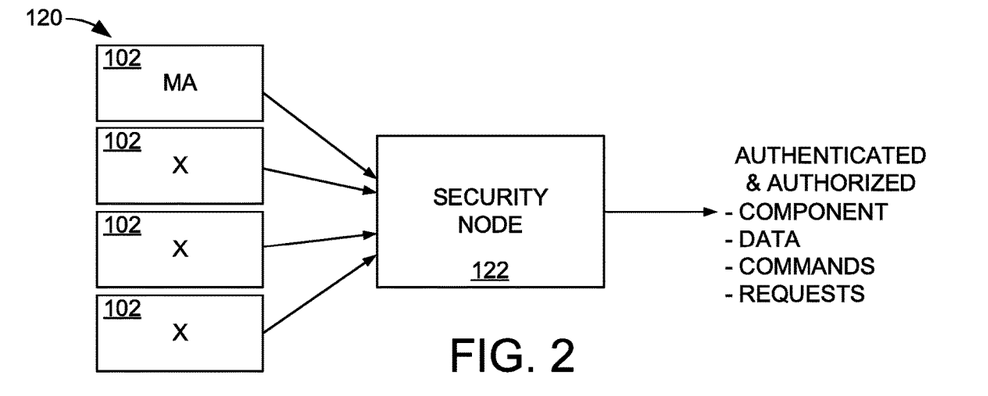
FIG. 2 depicts portions of an example computing system operated in accordance with assorted embodiments.

As shown in the portions of an example distributed computing system 120 that has detected a malicious threat in FIG. 2, but not required or limiting, a detected malicious attack (MA) on a single data storage device component 102 can lead to an assumption that every system component 102 (X), communicated command, and/or communicated data has been compromised until authenticated. Such assumption can result in a bottleneck at one or more centralized system security nodes 122, such as a network controller, server, router, or enclosure, where components 102, data, and commands are verified as trustworthy via one or more authentication and authorization protocol prior to allowing data accesses and commands to be issued or satisfied.

While the centralization of system 120 authentication and authorization in a security node 122 can protect the system 120 from infiltration from a malicious attack, localizing authentication and authorization operations, such as decrypting data, proving device provenance, and checking component firmware/software versions, can impose operational degradation as greater numbers of components/data/commands are present to be authenticated than can be efficiently completed. The assumption of system components as compromised by a malicious threat exacerbates the inefficiency of centralization of authentication and authorization. Hence, at the conclusion of the authentication of the assorted aspects of the distributed computing system 120, the risk of compromised components 102 and data is mitigated, but at the cost of highly degraded data storage performance during such authentication.

Figure 3:
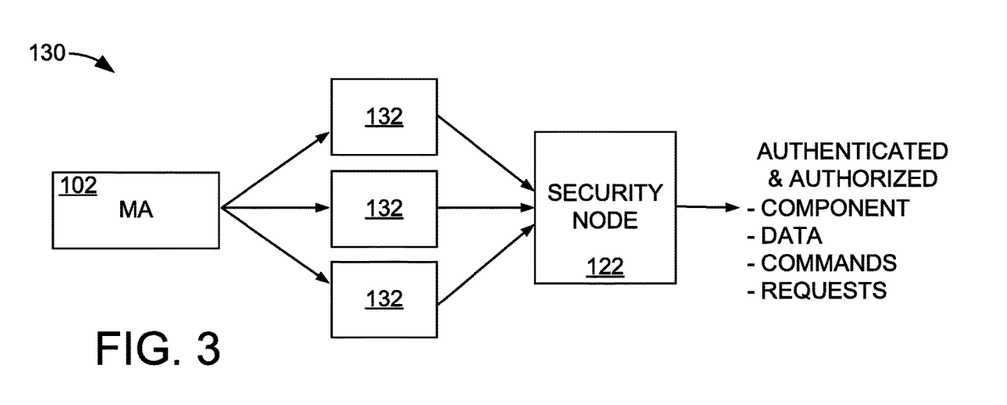
FIG. 3 depicts portions of an example computing system utilized in accordance with various embodiments.

Accordingly, various embodiments are directed at optimizing how the system 120 reacts to malicious threats and how components 102 and data are authenticated. FIG. 3 depicts a block representation of portions of an example distributed computing system 130 configured in accordance with some embodiments to decentralize authentication and authorization of computing system aspects in response to a malicious threat. A malicious attack (MA) at any system component 102 prompts the security node 122 to elicit multiple separate authenticating devices 132 for one or more security measures that collectively verify the trustworthiness of the attacked component 102.

The security measures of the authenticating devices 132 may be different, or uniform, to test the extent a malicious attack has infiltrated the system component 102. For example, a security measure may be a security challenge, such as an encryption key, past data performance, or current firmware version, may be a provenance verification, such as tracking the historical connections of the component 102, or may be a unique secret value/string that is generated solely to verify that the system component 102 has not been compromised by an attack. By distributing component authentication to multiple different devices 132, the security node 122 can process greater numbers of connected system components 102 due to the authenticating devices 132 engaging in pre-screening at least one component 102.

The result of the collective authenticating of at least one system component 102 can be the decentralization of operations that otherwise would be conducted in the security node, as shown in FIG. 2. However, the decentralization of component authorization can be wrought with difficulties. For instance, decentralized secret sharing with a uniform scheme can be slow and inefficient to verify some components 102 while being insufficient to verify other components, depending on the severity and scope of the malicious attack, function of the attacked component 102, and sensitivity of data being stored in the component 102. In addition, decentralization of component 102 authentication can create a lengthy and inefficient process of reconstruction in the event that an authenticating device 132 fails or is compromised by an attack. Thus, the decentralization of component 102 authentication away from the security node 122 can provide operational improvements, but has operational inefficiencies not previously addressed or solved.

Figure 4:
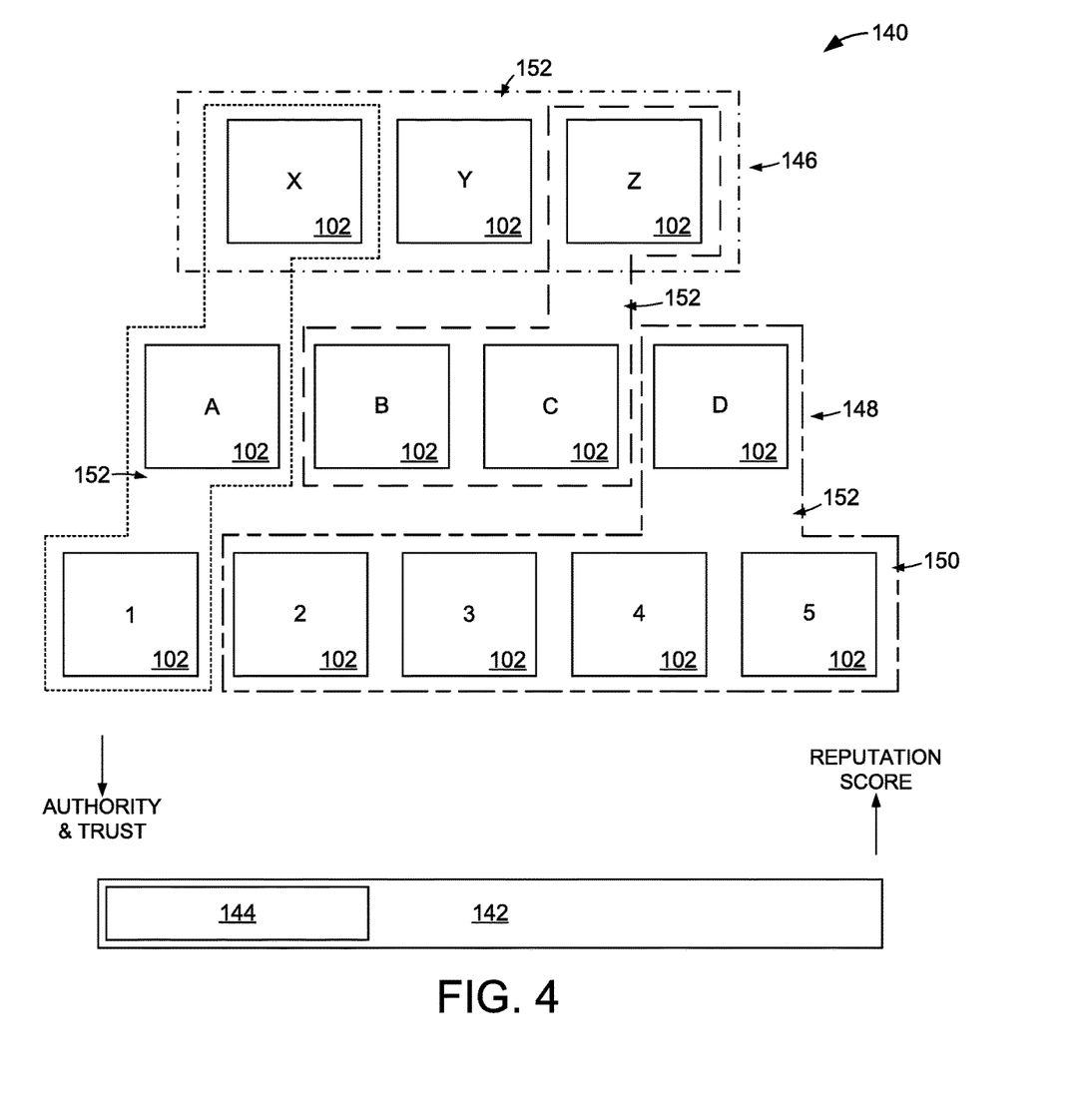
FIG. 4 depicts portions of an example computing system that can be employed in a computing system in accordance with assorted embodiments.

FIG. 4 depicts a block representation of an example distributed computing system 140 arranged and employed in accordance with various embodiments to provide optimized decentralized authentication and authorization in response to a detected, or predicted, malicious attack. Deploying a decentralize module 142 in the computing system 140 allows for a security reputation score to be generated and maintained for multiple different components 102 of the system 140. A reputation score can be any value assigned to a component 102 to represent a trustworthiness of the component 102.

In some embodiments, the decentralize module 142 assigns a reputation score based on characteristics of a component 102. It is noted that the decentralize module 142 can be resident as hardware, software, or both in any component of a distributed computing system, such as in a host, network node, or data storage device. It is contemplated that more than one decentralize module 142 may be present in a system and concurrently, or sequentially, activated to provide intelligent decentralization of data and/or component authentication.

As a non-limiting example, a decentralize module 142 derives a reputation score based on a detected computational power of the component 102 and/or a strength of cryptographic algorithms running on the component 102. In some instances, each component 102 of the system 140 may be assigned an initial reputation score during manufacturing and prior to be released to a customer to generate, transmit, or store customer-generated data. The decentralize module 142 may then alter the reputation score of a component 102 in response to the component 102 conducting more, or less, trustworthy behavior. For example, decentralize module 142 may adjust the reputation score of a particular component 102 up or down in response to determining the particular component 102 was the victim of a malicious attack. In one scenario, decentralize module 142 adjusts the reputation score of a particular component 102 in response to determining the amount of malicious events, such as threats, unsuccessful attacks, and/or successful attacks, experienced by the particular component 102 over a period of time is less than or equal to a threshold amount of malicious events, such as one, zero, or ten.

The decentralize module 142 can maintain a private ledger 144 where the reputation scores of each monitored component 102 can be tracked without concern about the ledger being infiltrated, copied, or modified maliciously. That is, the decentralize module 142 can maintain a private ledger as a secure database of reputation scores that provide an unforgettable identity in combination with the operational aspects of the components 102. Some embodiments provision each component 102 with a public-private key pair that complements the private ledger to create immutable identification of components 102 based on the security reputation of the components 102 themselves.

The generation, alteration, and maintenance of reputation scores for components 102 allows the decentralize module 142 to create logical levels and component subsets that provide efficient decentralization of device, data, and command authentication/authorization. In the non-limiting embodiment shown in FIG. 4, components X, Y, and Z have similar reputation scores, such as above a first predetermined threshold, are organized into a first subset 146 while a second subset 148 is formed of components A, B, C, and D and a third subset 150 includes components 1, 2, 3, 4, and 5 corresponding with different respective reputation score ranges. It is noted that subsets 146, 148, and 150 can be any size and can be modified over time by the decentralize module 142 to optimize authentication/authorization.

The various subsets 146/148/150 can have different responsibilities and assignments to authenticate a component, data, or command based on an authentication scheme generated by the decentralize module 142. For more trusted components in the first subset, authentication may involve more activity, such as comparing encryption keys, issuing challenge questions, or providing passwords, than components in the second or third subsets. The reliance of more trusted components for authentication operations can be resource intensive and can be balanced by sharing authentication duties with lesser-trusted components of the other subsets.

As illustrated by segmented boxes, the decentralize module 142 can assign components of different subsets 146/148/150 together to form authentication groups 152. Each authentication group 152 provides a decentralized association that can efficiently conduct one or more authentication measures to authorize data and commands prior to the data or commands being satisfied or transmitted. It is contemplated that the decentralize module 142 adaptively maintains the respective groups 152 to provide a variety of authentication options based on the type, scope, and severity of a detected, or predicted malicious attack. For example, an attack to highly sensitive data can prompt the use of an authentication group 152 with greater numbers of trusted components while a relatively minimal malicious threat can be more efficiently mitigated via authorization from lesser trusted components utilizing less resource intensive authentication measures.

As another example the decentralize module 142 increases or decreases the number of devices 102 in an authentication group 152, which alters the number of devices 102 that participate in authenticating and/or authorizing data and components of a system. Such authentication group 152 alteration is conducted, in some embodiments, in response to the storage of sensitive data, an attack on sensitive data, or a change in a malicious threat. The ability to dynamically adjust an authentication group 152 with the decentralize module 142 allows for greater, or lesser, device 102 involvement commensurate with the current conditions of the system.

Through the maintenance of the assorted reputation score-based subsets 146/148/150, the decentralize module 142 provides predetermined authentication groups 152 that can efficiently authenticate system aspects in response to a malicious threat and/or attack. The decentralize module 142 intelligently assigns authentication groups 152, which provides the decentralization of authentication along with a balance of proper security/trust to adequately authenticate without unduly occupying time and system resources conducting redundant and/or superfluous authentication activity. It is noted that the various subsets 146/148/150 and groups 152 are logically organized for use in a malicious state where malicious threats and/or attacks are detected or predicted. Hence, the respective components 102 can be utilized individually and collectively in any sequence to service data access request and system commands when a malicious threat/attack are not detected or predicted.

Figure 5:
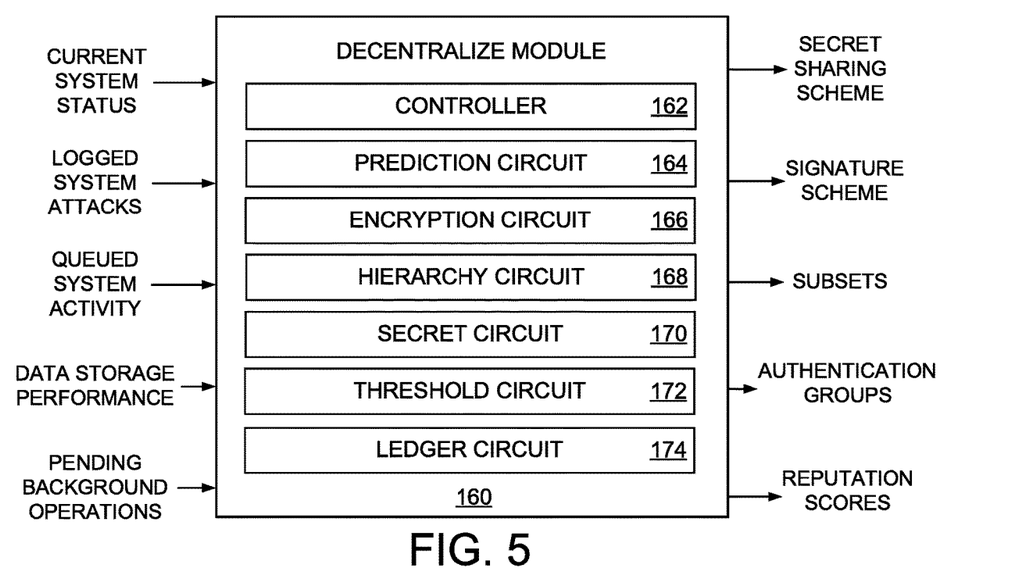
FIG. 5 depicts a block representation of an example decentralize module capable of being utilized in a computing system in various embodiments.

FIG. 5 depicts an example decentralize module 160 that can be utilized in the computing systems of FIGS. 1-4 to provide optimal intelligent response to malicious activity. The decentralize module 160 can utilize one or more controllers 162 to conduct the generation and maintenance of multi-subset authentication groups as well as the reputation scores for the assorted components of a distributed computing system. A controller 162 is not limited and may be any intelligence, such as a microprocessor or other programmable circuitry.

It is noted that the decentralize module 160 may be positioned anywhere in a distributed computing system with an independent, or shared, controller 162. For instance, the decentralize module 160 may be resident as hardware in a data storage device, network server, or data generating host with a controller 162 that operates to conduct only module 160 operation or is shared to conduct both module 160 operation as well as data generation, distribution, or storage.

The module controller 162 can direct high-level operations while individual circuitry conducts task-specific operations. In the non-limiting example module 160 of FIG. 5, the module 160 inputs a variety of information about current and pending system operations to generate component reputation scores along with authentication groups that are logically organized into different trust subsets. Prediction circuit 164 may utilize the input information to forecast one or more future events, actions, risks, and performance of at least one component of a distributed computing system. Such forecasts can involve when data will be requested, where data will be moved, the risk of errors in storing or retrieving data, when component maintenance operations will be necessary, risk of a malicious attack succeeding for a component, risk a successful attack will spread to other system components, and data at risk of being compromised in the event of a successful attack.

The prediction circuit 164 can further forecast how hypothetical malicious threat elimination and/or mitigation strategies will fare. That is, the prediction circuit 164 may be tasked by the controller 162 to predict the chance a current, or hypothetical, authentication procedure, authentication group organization, and/or decentralized authentication scheme will be successful in preventing, or mitigating, a malicious attack to at least one system component. The accurate and proactive operation of the prediction circuit 164 allows an encryption circuit 166 to generate and maintain encryption schemes that balance operational efficiency with the appropriate security status to control malicious threats and attacks.

The encryption circuit 166 may be tasked with creating different encryption types, keys, and decryption standards for different subsets of components. It is contemplated that the encryption circuit 166 generates one or more keys from the private ledger of reputation scores and/or one or more reputation score of a component. The ability to generate encryption mechanisms with the encryption circuit 166 from a secure ledger and/or with dynamic component reputation scores provides efficient and highly secure authentication protocol that is difficult to recreate, mimic, and override.

The decentralize module 160 can have a hierarchy circuit 168 that continuously, or sporadically, maintains the parameters associated with the various component subsets. In other words, the hierarchy circuit 168 may evaluate current and predicted system performance and risk of malicious threats to set the reputation scores and size of assorted component subsets. The hierarchy circuit 168 can set and adapt the authorizations of the assorted subsets, and constituent components, to perform various authentication functions. For example, hierarchy circuit 168 assigns a subset of components with a first authority that allows for single component authentication of data during a low malicious threat risk. In another example, hierarchy circuit 168 assigns a second authority to a different subset of components during malicious attack or a high threat risk. The ability to adjust subset and component authority efficiently allows for dynamic adaptation to changing security conditions and risks.

In some examples, decentralize module 142 logically organizes system components into subset sand authentication groups in response to a predetermined number of malicious threats. For example, a threshold circuit 172 can assign a number of threats that can be tolerated with an acceptable level of risk with the current component/data/command authentication protocol. The threshold circuit 172 may further predetermine a reactionary number of components from one or more subsets that are needed to authenticate a component/data/command after a set threshold threat value has been reached. As such, the threshold circuit 172 can proactively compute how logical component subsets will operate if and when enough malicious threats are present to merit increased security scrutiny.

While the threshold circuit 172 can assign the number of components and subsets needed to authenticate aspects of a computing system, a secret circuit 170 can set the type and manner in which decentralized authentication can occur via various subsets and authentication groups as part of a secret sharing scheme. That is, the secret circuit 170 can predetermine the size and subsets of an authentication group along with the secrete a group will participate to actually authenticate a component/data/command. The resultant secret sharing scheme may be different for different logical authentication groups and may involve the use of a selected secret, such as past security login information, firmware versions, location of data, data storage performance, number of components in a subset, reputation score of a component, or physical parameter of a component. It is contemplated that the secret circuit 170 further generates and maintains a signature scheme that prescribes authentication groups to sign a message before the message can be sent between system components.

Through the operation of the various circuitry of the decentralize module 160, component reputation scores, subsets, and authentication groups can be generated and adapted to system conditions over time. A ledger circuit 174 can operate to ensure the secure protection of at least one private ledger where component reputation scores are recorded. The ledger circuit 174 can conduct any number and type of action to protect and secure the private ledger. For instance, but in no way limiting, the ledger circuit 174 may relocate portions of the private ledger, utilize different encryption, quarantine, and store deliberately false information in order to prevent any malicious attack from infiltrating the private ledger.

Figure 6:
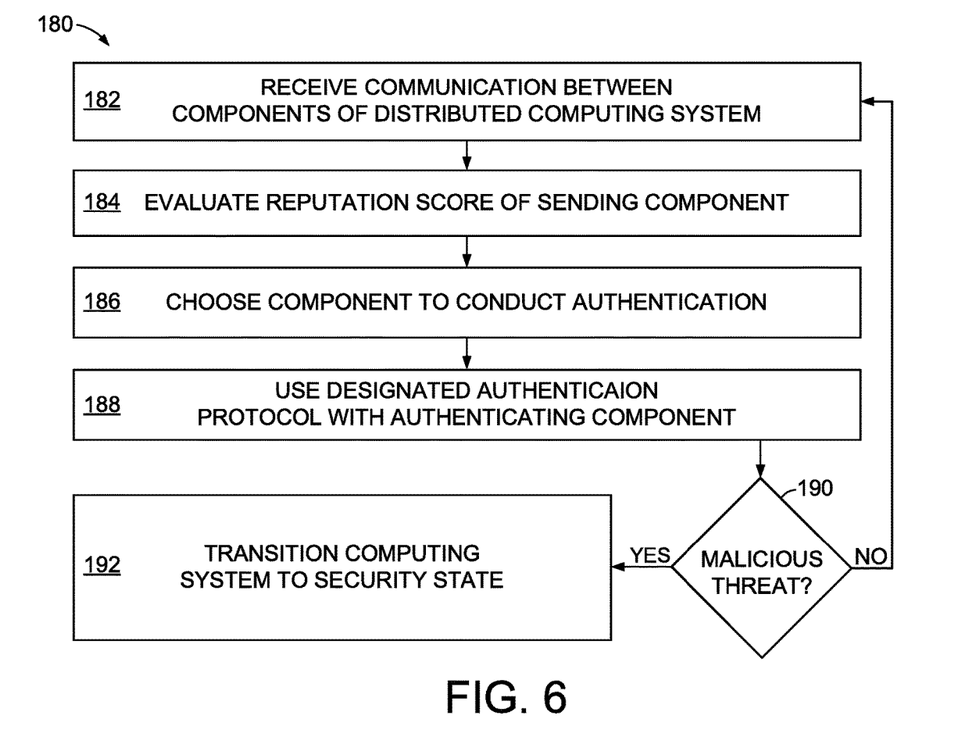
FIG. 6 depicts a flowchart of an example authentication routine that can be executed in accordance with some embodiments in a computing system.
Figure 7:
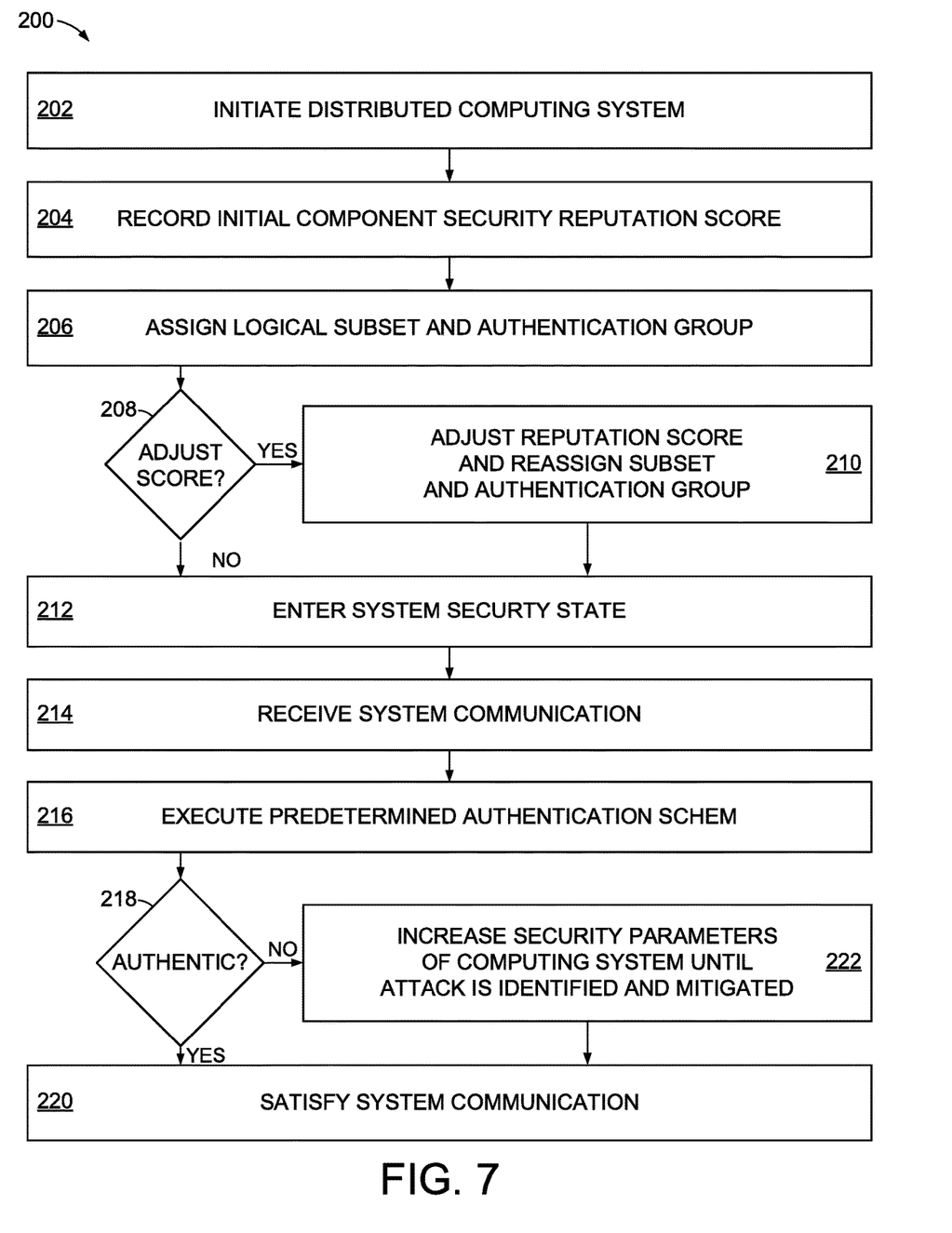
FIG. 7 provides a flowchart of an example authentication routine that may be carried out with the assorted embodiments of a computing system.

As conveyed in FIGS. 4 & 5, a decentralize module can be used to optimize the authentication of system components, data, and commands. FIGS. 6 & 7 convey authentication routines 180/200 that may be enabled by the use of a decentralize module as part of a distributed computing system. In the authentication routine 180 of FIG. 6, a decentralize module has assigned a threshold number of malicious threats to trigger a heightened security state and that threshold has not been met when step 182 receives communication between components of a distributed computing system. Such information can be any type and length, such a data access request, operational command, background activity, or software update, intercepted by a decentralize module after being sent by a sender and prior to being received by a designated destination component.

Step 184 evaluates the reputation score of the sending component from the private ledger and a system component is chosen in step 186 to authenticate the sending component. In one example, decentralize module 160 assigns a component to conduct authentication that has a higher reputation score. In one instance, decentralize module 160 assigns a component to conduct authentication that is logically organized in a higher subset than another component assigned to conduct authentication. The selection of an authenticating component in step 186 prompts the use of a designated authentication protocol in step 188 where a security parameter, such as password, key, certificate, challenge question, or physical component parameter, is used to authenticate and authorize the sender and information to be satisfied by the designated destination.

At any time during steps 182-188, a security node and/or decentralize module can test, detect, or predict a malicious threat to one or more components of a computing system. Decision 190 evaluates the presence and number of malicious threats and compares that number to a threshold security threshold value set by the decentralize module. If the number of malicious threats, including attempted attacks, is below the security threshold value, the routine 180 returns to step 182 where communicated information is authenticated as part of a non-security system state. In the event a number of malicious threats is greater than the set threshold, or if an attack has been successful, step 192 is triggered to take the system to a security state where greater than one component, as part of an authentication group, are used to authenticate system information.

The authentication routine 200 shown in FIG. 7 corresponds to a distributed computing system entering a security state, such as from step 192 of routine 180, or if a single malicious threat poses a great enough risk to sensitive data and/or components. However, prior to entering a security state, a distributed computing system is initiated in step 202 with at least one host connected to a data storage device. The data storage device initially has a manufacturer-assigned security reputation score that is derived from the computational capacity of the device and the strength of cryptographic algorithms available on the device. Decentralize module 160 records the initial security reputation score on a secure private ledger in step 204. Decentralize module 160 assigns a data storage device a logical subset and authentication group in step 206.

In decision 208, decentralize module 160 monitors activity of the host, data storage device, and other computing system components to determine whether the reputation score is to be adjusted to be higher or lower. In response to determining to update the reputation score, in step 210, decentralize module 160 adjusts the reputation score of a component and reassigns subsets and authentication groups, which may result in different, or the same, subsets and groups as prior to the score adjustment. The updated reputation score is recorded on the private ledger. At the conclusion of the score adjustment and reassignments, or in the event no score adjustment is called for, step 212 enters a security state and automatically transitions to a multi-component decentralized authentication that utilizes a predetermined secret sharing scheme and signature scheme created by the decentralize module.

In response to receipt of a system communication during the security state in step 214, execution of the secret sharing scheme, in the case of authenticating a component or data, or the signature scheme, in the case of authenticating a message or command, occurs in step 216. The execution of a predetermined scheme in step 216 may involve one or more authentication groups with different system components sharing portions of a secret, or separately signing, to prove the authentic and secure nature of the sending component, data being sent, or communication being transmitted. The storage of separate secrets in different trust tiers of subsets increases the security of the compiled secret and the verification of authentication. Such separate secrets further decreases the risk the secret being fully compromised by a malicious attack, which allows the authentication group to easily reconstruct and change secrets in the event an attack compromises a portion of the secret.

The intelligent management of the authentication groups and subset tiers based on derived security reputation scores provides an optimized balance between using highly secure, but slow authentication mechanisms with fast, but less secure authentication mechanisms. In other words, the management of the authentication groups provides a predetermined security state organization where components having different trust scores and encryption capabilities to be used to efficiently provide portions of secret to authenticate a component, data, and commands. Such authentication groups and system component reputation scores contrast using a single component, or the same group of separate components for every authentication, to verify authenticity and provide authority to various aspects of a computing system.

After the execution of a secret sharing scheme, or signature scheme, authenticity is determined in decision 218. An authentic component, data, or command prompts step 220 to satisfy the data request, allow component access, and/or complete the issued command. However, a failed authentication from decision 218 triggers step 222 to increase security parameters of the computing system to determine if an attack has been successful and then isolate and eliminate the scope of a successful attack. The measures and protocol used in step 222 to identify a successful, or unsuccessful, malicious attack and to mitigate a successful attack are not limited and can be dynamically planned and deployed by a security node, decentralize module, and system component.

As a result of step 222, the historical activity of the involved components are logged and new security reputation scores are computed in step 224 and further stored in the private ledger. It is contemplated that new reputation scores prompts the reassignment of one or more components to different subsets and/or authentication groups. It is further contemplated that new reputation scores prompt the generation, or alteration, of secret sharing schemes with the decentralize module. Hence, routine 200 can utilize a decentralize module to dynamically adapt to changing component, security, and system activity over time to provide a continually optimized balance of authentication efficiency and capability.

Through the various embodiments of a computing system employing at least a decentralize module, a secret sharing scheme can be intelligently generated and executed via authentication groups. Secret sharing provides a means to distribute shares of a secrets so that any authorized subset of participants specified by a publicly known access structure, can recompute the secret. Secret sharing schemes grant all subsets of parties with cardinality equal to or greater than a certain threshold authority to reconstruct the secret.

The use of hierarchical threshold secret sharing schemes provides a means for sharing a secret among a group of participants that are respectively positioned into multiple levels involving at least one subset. In such schemes, a threshold number of participants at each level are required to recover the secret. Similarly, hierarchical threshold signatures are an extension of secret sharing where signing parties are divided among multiple different levels with each level having a predefined threshold number parties that must sign to authenticate a message/command. If a message/command is signed by at least the threshold number of signers specified for each level, only then is it considered a valid signature.

By assigning an updateable reputation score, which is derived in a decentralized manner and initially manufacturer assigned based on the computational power of the component and the strength of the cryptographic algorithms present on the component, the various subsets, hierarchical levels, and authentication groups can be intelligently assigned with a variety of trust relationships and security authentication efficiencies. It is contemplated that a component manufacturer sets a hierarchical component level based on a reputation score, which enables hierarchical secret sharing and signatures. Since component reputation scores are updateable, components can move between levels and subsets in response to changes in respective reputation scores. The level of the component can govern whether it is authorized to perform certain security, or operational, functions with higher scores having greater trust and authority.

A level/subset of a component can dictate the minimum number of components of that level/subset that must collaborate in order to perform authentication, authorization, and signature generation for that level/subset. The component manufacturer can write the assigned reputation score and level/subset of a component in a private ledger while provisioning each component with a public-private key pair.

With a decentralize module enabling separate components to conduct authentication with different authority and trust relationships, there is no requirement for central authority. Such decentralization of authentication allows components to be partitioned into different levels, subsets, and groups based on overall confidence the network has in them, as defined in the reputation score. The decentralization of components can efficiently identify malicious behavior and reduce the reputation score of components in response, which dynamically adapts a hierarchical component organization over time based on real-time system conditions.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method, comprising:
   deploying a decentralize module of a distributed computing system, the distributed computing system comprising a system component connected to a host, the system component assigned with an initial reputation score stored on a private ledger accessed by the decentralize module, the initial reputation score based on a characteristic of the system component;
positioning, by the decentralize module and based on the initial reputation score, the system component in a hierarchical device organization, the hierarchical device organization maintained by the decentralize module;
adjusting, by the decentralize module, the initial reputation score and position of the system component in the hierarchical device organization based on a behavior or operational aspect of the system component, recording the adjusted initial reputation score on the private ledger;
generating, by the decentralize module, a decentralized secret sharing scheme, the decentralized secret sharing scheme configured to authenticate the system component with multiple different secrets sourced from different system components logically positioned in different hierarchical levels, subsets, or groups of the hierarchical device organization based on respective reputation scores, each hierarchical level, subset, or group of the hierarchical device organization having different responsibilities, assigned by the decentralize module; and
authenticating, using the decentralize module, the host based on the generating,
wherein the behavior or operational aspect of the system component comprises at least one of a time without a malicious threat, a time without an attack to the system component, a malicious threat to the system component, or an attack to the system component.

2. The method of claim 1, wherein the system component is a data storage device that is assigned the initial reputation score by a manufacturer of the data storage device prior to releasing the data storage device to store user-generated data.

3. The method of claim 1, wherein the system component is a data storage device that is assigned a trust level by a manufacturer of the data storage device prior to releasing the data storage device to store user-generated data, the trust level corresponding to an authority of the data storage device to authenticate commands of the distributed computing system.

4. The method of claim 1, wherein the characteristic of the system component comprises at least one of a computation power of the system component and a strength of encryption algorithms present in the system component.

5. The method of claim 1, wherein the decentralize module adjusts an assigned authentication group in response to the adjusted initial reputation score, and wherein the adjusted assigned authentication group comprises multiple different system components with different reputation scores.

6. The method of claim 1, further comprising adjusting a security parameter, executing an authentication scheme, or transitioning the distributed computing system to a security state in response to 1) the authenticating, or 2) the adjusting of the initial reputation score.

7. The method of claim 1, wherein the decentralize module is configured to generate the secret sharing scheme, and wherein the decentralize module is configured to assign the system component to an authentication group of a plurality of authentication groups, wherein each authentication group is configured to provide a decentralized association that conducts one or more authentication measures to authorize data and commands prior to the data or commands being satisfied or transmitted.

8. A method, comprising:
providing a system component connected to a host and a decentralize module of a distributed computing system;
positioning, by the decentralize module, the system component in a hierarchical device organization based on a reputation score of the system component, the hierarchical device organization maintained by the decentralize module;
adjusting, by the decentralize module, the positioning of the system component in the hierarchical device organization based on a behavior or operational aspect of the system component, wherein the behavior or operational aspect of the system component comprises at least one of a time without a malicious threat, a time without an attack to the system component, a malicious threat to the system component, or an attack to the system component;
generating, by the decentralize module, a decentralized secret sharing scheme, the decentralized secret sharing scheme configured to authenticate the host with multiple different secrets sourced from different system components logically positioned in different hierarchical levels of the hierarchical device organization, each level of the hierarchical device organization having different responsibilities, assigned by the decentralize module;
executing, by the decentralize module, the decentralized secret sharing scheme responsive to a threshold number of malicious threats to the distributed computing system; and
authenticating, by the decentralize module, the host based on the generating.

9. The method of claim 8, wherein the threshold number of malicious threats are detected by a threshold circuit of the decentralize module.

10. The method of claim 8, wherein the threshold number of malicious threats are predicted by a threshold circuit of the decentralize module.

11. The method of claim 8, wherein the threshold number of malicious threats is altered by a threshold circuit of the decentralize module in response to a successful malicious attack to the distributed computing system.

12. The method of claim 8, wherein prior to the execution of the decentralized secret sharing scheme a non-security state authentication protocol is executed by the hierarchical device organization.

13. The method of claim 8, wherein the decentralized secret sharing scheme is not executed prior to the threshold number of malicious threats being detected or predicted.

14. The method of claim 8, wherein the decentralized secret sharing scheme is changed by the decentralize module in response to storage of sensitive data in the system component.

15. A distributed computing system, comprising:
a first system component and a second system component,
a decentralize module comprising a processor programmed to assign a reputation score to the first system component,
wherein the decentralize module is configured to:
position, based on the initial reputation score, the first system component in a hierarchical device organization,
maintain a hierarchical device organization based on the initial reputation score of the first system component, wherein the hierarchical device organization comprises a plurality of levels, subsets, or groups, and wherein each level of the plurality of levels, subset, or group is assigned an association with different responsibilities, generate a decentralized secret sharing scheme configured to authenticate at least one of the first system component or the second system component with multiple different secrets sourced from different system components logically positioned in different hierarchical levels, subsets, or groups of the hierarchical device organization based on respective reputation scores, adjust the hierarchical device organization based on a behavior or operational aspect of the first system component, wherein the behavior or operational aspect of the first system component comprises at least one of a time without a malicious threat, a time without an attack to the system component, a malicious threat to the system component, or an attack to the system component, and authenticate at least one of first system component or the second system component using the decentralized secret sharing scheme based on the adjusted hierarchical device organization.

16. The distributed computing system of claim 15, wherein the decentralize module is resident in the first system component as hardware.

17. The distributed computing system of claim 15, wherein the decentralize module is resident in the second system component, the second system component being a host as hardware, the host connected to the first system component.

18. The distributed computing system of claim 15, wherein the decentralize module is resident in a network node separated from the first and second system components, wherein the first system component is a data storage device, and wherein the second system component is a host.

19. The distributed computing system of claim 15, wherein the first and second system components are the same component.

* * * * *